United States Patent [19]
Leiter

[11] 4,183,255
[45] Jan. 15, 1980

[54] BICYCLE WITH DERAILLEUR ARRANGEMENT

[75] Inventor: Berndt Leiter, Werneck, Fed. Rep. of Germany

[73] Assignee: Fichtel & Sachs AG, Schweinfurt am Main, Fed. Rep. of Germany

[21] Appl. No.: 750,221

[22] Filed: Dec. 13, 1976

Related U.S. Application Data

[63] Continuation-in-part of Ser. No. 635,692, Nov. 26, 1975, abandoned.

[30] Foreign Application Priority Data

Dec. 16, 1974 [DE] Fed. Rep. of Germany ....... 2459341

[51] Int. Cl.² .......................... F16H 9/24; F16H 11/08
[52] U.S. Cl. .................... 74/217 B; 280/236
[58] Field of Search ............ 74/217 B, 242, 531, 74/242.11 B, 568 R, 506, 497, 501.5 R; 280/236

[56] References Cited

U.S. PATENT DOCUMENTS

| | | | |
|---|---|---|---|
| 3,364,763 | 1/1968 | Juy | 74/217 |
| 3,910,136 | 10/1975 | Juy | 74/611 |
| 3,927,904 | 12/1975 | Bergles | 280/236 |
| 4,002,080 | 1/1977 | Huret et al. | 74/217 B |
| 4,027,542 | 6/1977 | Nagano | 74/217 B |
| 4,051,738 | 10/1977 | Dian | 74/217 B |
| 4,061,048 | 12/1977 | Huret et al. | 74/217 B |

FOREIGN PATENT DOCUMENTS

| | | | |
|---|---|---|---|
| 1003373 | 11/1951 | France | 74/217 B |
| 1271896 | 8/1961 | France | 74/242 |

OTHER PUBLICATIONS

"The Handbook of Cycl-Ology" 7th edition, pp. 47-73, copyright 1976.

*Primary Examiner*—Samuel Scott
*Assistant Examiner*—William R. Henderson
*Attorney, Agent, or Firm*—Toren, McGeady and Stanger

[57] ABSTRACT

A bicycle having a rear derailleur arrangement for its drive chain which includes a four-bar linkage consisting of a support, two links, and a coupler, first and second pivots securing the support to the links, and third and fourth pivots securing the coupler to respective links. The support is fixedly fastened to the rear wheel shaft whose axis is parallel to a plane which is perpendicular to the parallel axes of the pivots and defines an angle of 15°–45° with the vertical in the normal operating position of the bicycle. A guide sprocket for the chain is secured to the coupler for rotation in a plane perpendicular to the shaft axis. All four pivots are offset from the shaft in a downward direction, and the first and second pivots are farther from the shaft than the third and fourth pivots.

13 Claims, 9 Drawing Figures

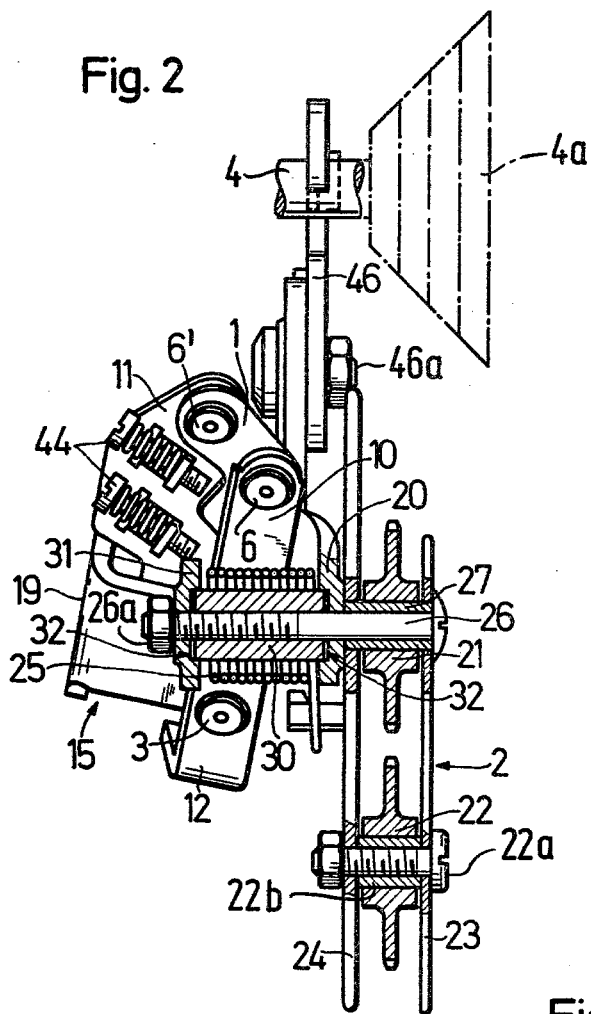
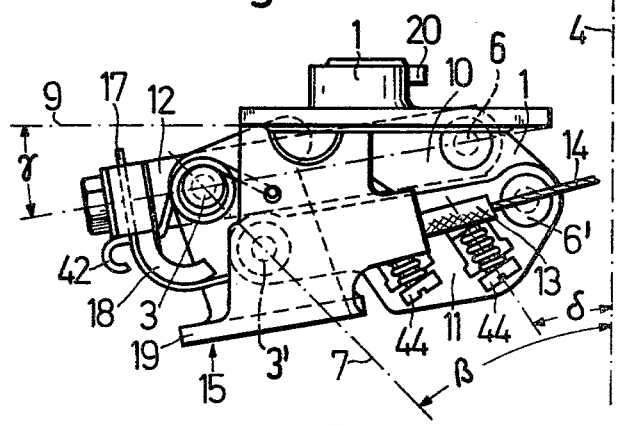

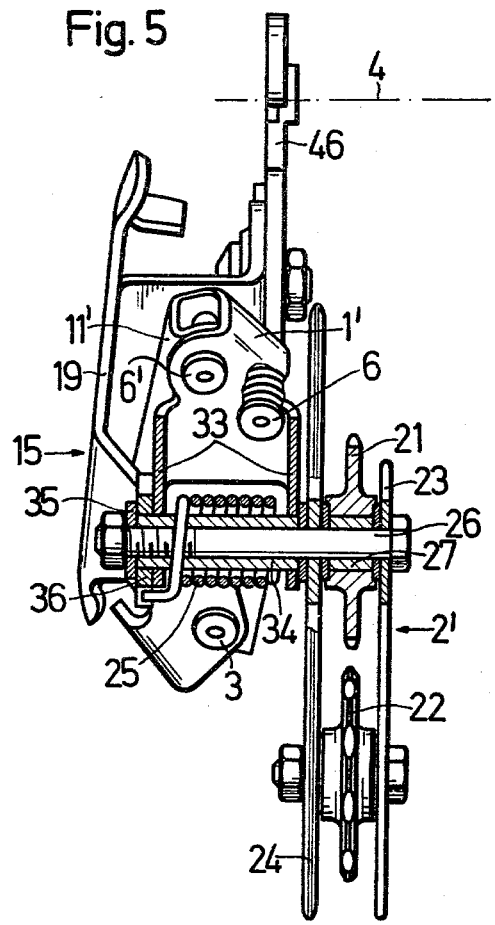
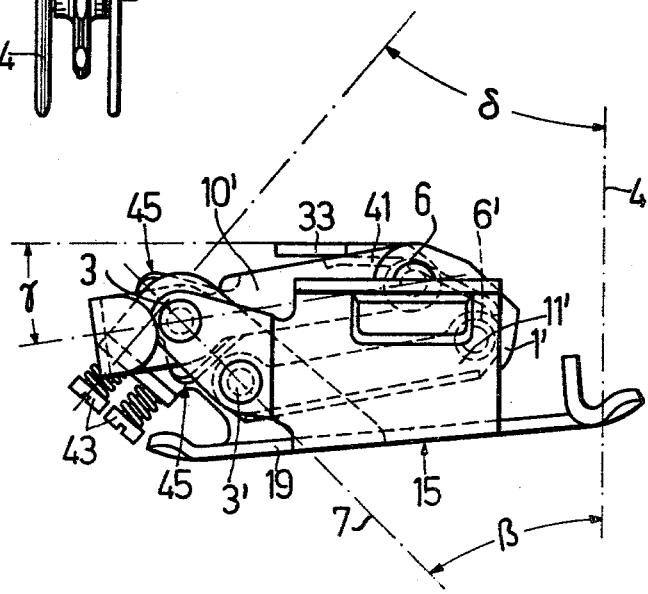

BICYCLE WITH DERAILLEUR ARRANGEMENT

This application is a continuation-in-part of my copending application Ser. No. 635,692, filed on Nov. 26, 1975, and now abandoned.

This invention relates to bicycles equipped with devices for varying the transmission ratio between the pedals and the chain-driven rear wheel of a bicycle, and particularly to improvements in a derailleur arrangement in which the drive chain may alternatively be trained over sprockets of different diameters on the rear wheel hub.

More specifically, the invention is concerned with improvements in known derailleur arrangements exemplified in U.S. Pat. No. 3,364,762 in which a guide sprocket may be moved by a parallelogram linkage along a plurality of sprockets on the rear wheel shaft of the bicycle for shifting the drive chain between the several sprockets.

It is the primary object of this invention to provide a bicycle with a derailleur arrangement of the basically known type which permits smooth shifting of the chain between the several driven sprockets, is capable of easily performed routine adjustments, and is simple in its construction.

With these and other objects in view, as will hereinafter become apparent, the bicycle of the invention is equipped with a derailleur arrangement including a four-bar linkage, that is, a support member, two link members, a coupler, and four pivots having parallel axes. The first and second pivots secure the support member to the link members respectively, and the third and fourth pivots respectively secure the coupler member to the link members. The support member is fixedly fastened to the frame of the bicycle, preferably to the shaft of the rear wheel, in a position in which a plane perpendicular to the axes of the pivots is parallel to the rear wheel shaft and inclined relative to the vertical at an angle of 15° to 45° when the bicycle stands on a horizontal surface and its wheel axes are parallel. The guide sprocket which shifts the drive chain between several coaxial sprocket wheels on the rear wheel is secured to the coupler member for rotation in a plane perpendicular to the rear wheel axis. The several pivots are offset from the rear wheel shaft in a downward direction, the first and second pivots being lower than the third and fourth pivots.

Other features, additional objects, and many of the attendant advantages of this invention will readily become apparent from the following detailed description of preferred embodiments when considered in connection with the appended drawing in which:

FIG. 2 illustrates the arrangement of FIG. 1 and associated elements of a bicycle in partly sectional front elevation;

FIG. 3 shows the four-bar linkage of the same derailleur arrangement in a view perpendicular to plane 5 in FIG. 1;

FIGS. 4 to 6 show a modified derailleur arrangement of the invention in views corresponding sequentially to those of FIGS. 1 to 3;

Figure 9:
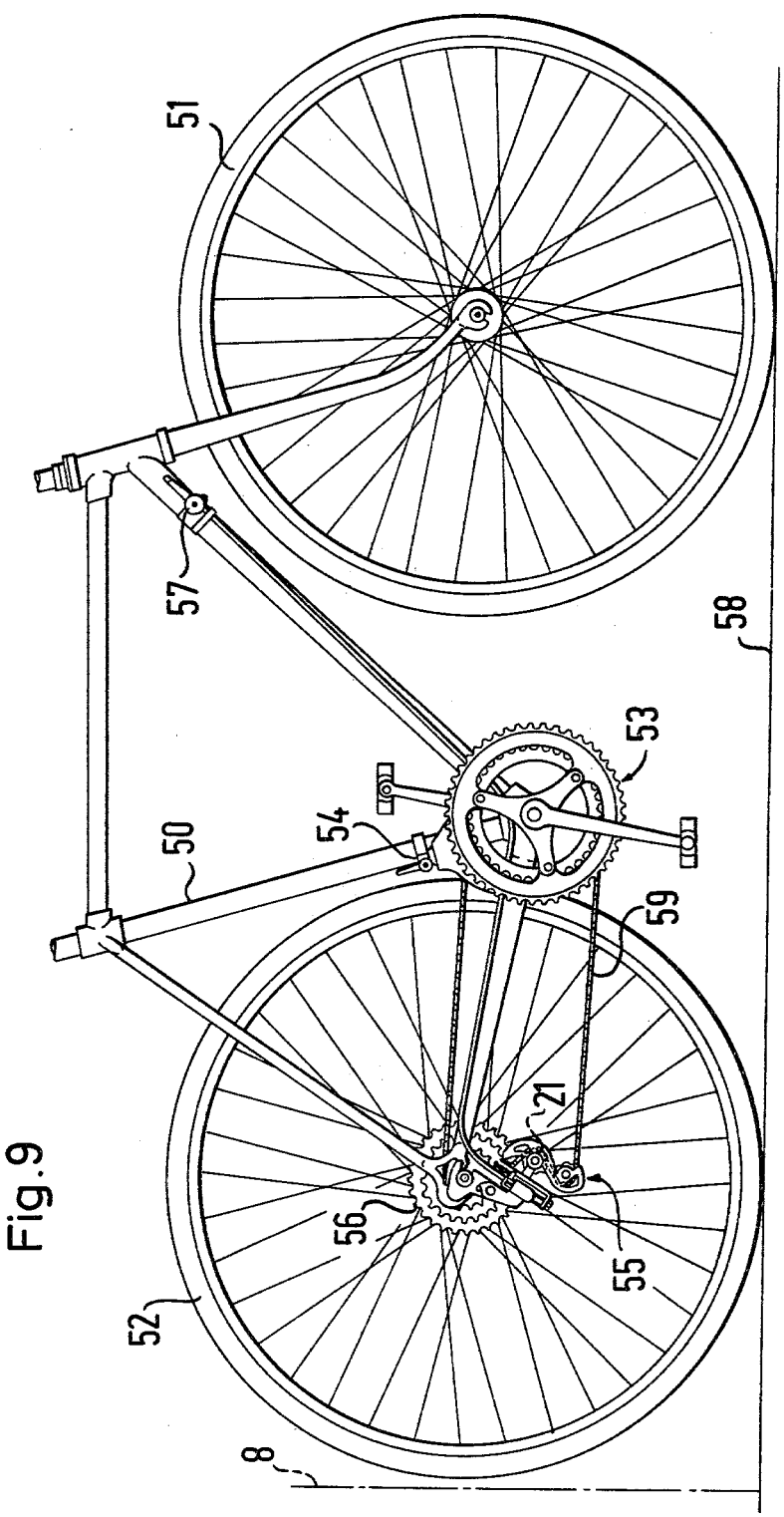
FIG. 9 shows a ten-speed bicycle equipped with the derailleur arrangement of FIG. 1.

Referring initially to FIG. 9, there is shown as much of an otherwise conventional, ten-speed bicycle equipped with a derailleur arrangement according to this invention as is needed for an understanding of the same.

The bicycle frame 50 carries two wheels 51, 52 of equal diameter which rotate in the plane of the frame when their axes are parallel as is shown in FIG. 9. The rear wheel 52 may be driven by rotating an assembly 53 of pedals and two chain wheels, the associated chain 59 being shifted in a conventional manner between the two chain wheels by means of a front derailleur 54. A rear derailleur arrangement 55 with the improvement of which this invention is more specifically concerned permits the drive chain 59 to be shifted by a guide sprocket 21 among five coaxial gear wheels 56. The two derailleurs 54, 55 are operated by means of a set of shifters 57 mounted on the frame 50. The wheels 51, 52 define a common tangential plane 58 below the frame 50 and a family of lines 8 perpendicular to the plane 58. When the bicycle travels over flat ground, the plane 58 is horizontal, and the lines 8 are vertical. They will be referred to hereinafter as being horizontal and vertical, regardless of their actual angular relationship to the field of terrestrial gravity.

Figure 1:
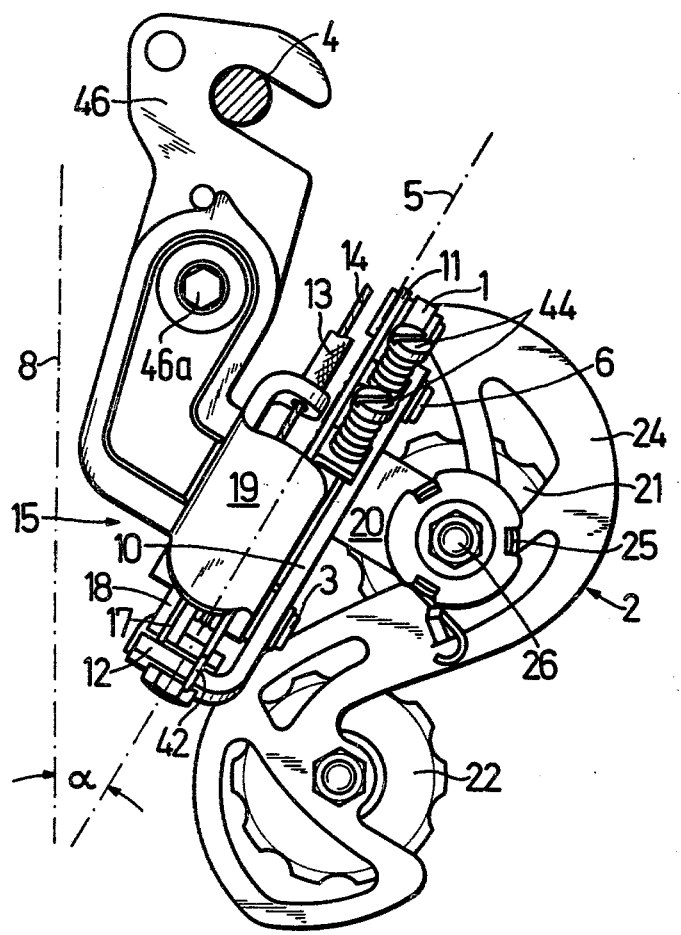
FIG. 1 shows a derailleur arrangement of the invention in a side elevational view.

FIGS. 1–3 illustrate the rear derailleur arrangement and as much of other, conventional elements of the bicycle of FIG. 9 as is needed for an understanding of the invention. The derailleur arrangement includes a two-part bracket 46 whose parts are adjustably connected by a bolt 46a. One of the two parts is hooked over the shaft 4 of the rear wheel 52 and secured thereon by nonillustrated nuts, the other part being fixedly fastened to an approximately channel-shaped support 15 for the operating elements of the derailleur arrangement. The shaft 4 carries a cluster 4a of five sprockets 56 of which four are indicated in phantom view only in FIG. 2. The sprockets increase in diameter from the bracket 46 toward the hub of the driven rear wheel 52. The sprockets and other conventional elements of the bicycle have been omitted from most Figures of the drawing to avoid crowding.

The support 15 is one of the elements of a four-bar linkage whose other elements are protected against accidental damage by the web 19 of the support 15 which projects beyond other parts of the derailleur mechanism away from the rear wheel 52, as is evident from FIG. 2. The other elements of the linkage, best seen in FIG. 3, are two sheet metal links 10, 11 secured to the support 15 by respective pivots 3, 3' remote from the shaft 4, and a coupler 1 attached to the links 10, 11 by respective pivots 6, 6' nearer the shaft. The parallel axes of the four pivots 3, 3', 6, 6' define a parallelogram in a plane 5, perpendicular to the pivot axes and parallel to the axis of the shaft 4, and inclined at an angle α of about 15° to 45° relative to the vertical 8.

The link 10 is a two-armed lever whose longer arm connects the pivots 3, 6, and whose shorter, L-shaped arm 12 extends beyond the associated pivot 3 and is engaged by one end of a spiral spring 42 coiled about the pivot 3. The other end of the spring 42 engages the support 15 and thereby biases the linkage toward the position shown in FIG. 3. The linkage may be moved away from the illustrated position in the plane 5 by a Bowden cable leading to one of the manually operable shifters 57. The sheath 13 of the cable abuts against the support 15. The tension wire 14 has a free end 17 attached to the arm 12 and guided in an arc of about 90° over a cam 18 on the arm whose engagement face spirals about the axis of the pivot 3 in such a manner that the radial distance of the pivot axis from the point of first engagement between the wire 14 and the cam 18 decreases when the cam is moved counterclockwise by the wire 14 from the position seen in FIG. 3. The angle γ between the longitudinal axis of the link 10 through the pivots 3, 6 and a plane 9 perpendicular to the shaft 4, represented in FIG. 3 by a chain-dotted line, should not exceed 15°, and may be zero in the illustrated, terminal position of the four-bar linkage.

The link 11 is a flat plate having a narrow end near the pivot 3' and a wider end near the pivot 6'. Upturned lugs on the wider end hold two abutment screws 44 which are readily adjusted for limiting the range of movement of the linkage. The axes of the screws 44 are inclined relative to the shaft 4 at an angle δ of 30° to 50°. In respective terminal positions of the linkage, the screws 44 abut against a projection on the coupler 1, best seen in FIG. 2, and against the support 15.

The chain guiding and tensioning mechanism 2 is mounted on an integral lug 20 of the coupler 1. A long bolt 26 parallel to the shaft 4 passes through an opening in the lug 20. A bearing bushing 27 is axially secured between the head of the bolt 26 and the lug 20. The bushing rotatably supports two chain guides 23, 24 of flat sheet metal and a guide sprocket 21 between the guides 23, 24. A tensioning sprocket 22 is mounted between the guides 23, 24 on a bolt 22a and bushing 22b for rotation in a common plane with the sprocket 21 which, in the illustrated position, is aligned with the smallest chain sprocket 56 on the shaft 4. The portion of the bolt 26 between the lug 20 and a nut 26a on the end of the bolt carries an otherwise cylindrical sleeve 30 whose polygonal ends 32 are conformingly received in recesses of the lug 20 and of a washer 31 backed by the nut 26a. Respective ends of a yieldably resilient helical torsion spring 25 coiled about the sleeve 30 are secured to the washer 31 and to the chain guide 24 so as to bias the mechanism 2 clockwise, as viewed in FIG. 1, thereby to tension the chain normally trained over the sprocket 22, but omitted from FIGS. 1 to 8. The tension of the spring 25 is readily adjusted after loosening of the nut 26a.

The derailleur arrangement is mounted on the rear wheel shaft 4 by means of the bracket 46 in such a manner that the plane 5 of movement of the four-bar linkage is within the range of 15° to 45°. When the Bowden cable is operated, the guide sprocket 21 travels in a circular arc closely parallel to the tapering surface which envelops the rear wheel sprockets 56. The free length of the non-illustrated chain between the guide sprocket 21 and the selected sprocket 56 remains virtually unchanged at the several transmission ratios.

The links 10, 11 must move through longer arcs when the chain is shifted between the largest rear wheel sprockets than during shifting between the smaller sprockets 56, and the different movements are achieved by equal longitudinal movements of the Bowden wire 14 and corresponding equal movements of the associated shifter 57 because of the cam 18 which shifts the point of engagement between the wire 14 and the arm 12 nearer toward the axis of the pivot 3 as the sprocket 21 moves from the illustrated position toward radial alignment with the bigger sprockets 56. The Bowden cable runs between the flanges of the support 15 and is thereby protected against accidental damage. The wire 14 and the sheath 13 extend from the arm 12 in a direction generally toward the shaft 4, and thus toward the bicycle frame 50, not itself seen, to which they are fastened by clips in the conventional manner. The unsupported length of the cable between the derailleur arrangement and the bicycle frame is thus reduced to a minimum.

The abutment screws 44 are readily accessible for adjustment, yet they do not project longitudinally beyond the link 11, and are thus protected by the link against accidental damage. Their angular offset of about 30° to 50° relative to the axis of the shaft 4 makes such an arrangement possible.

Figure 4:
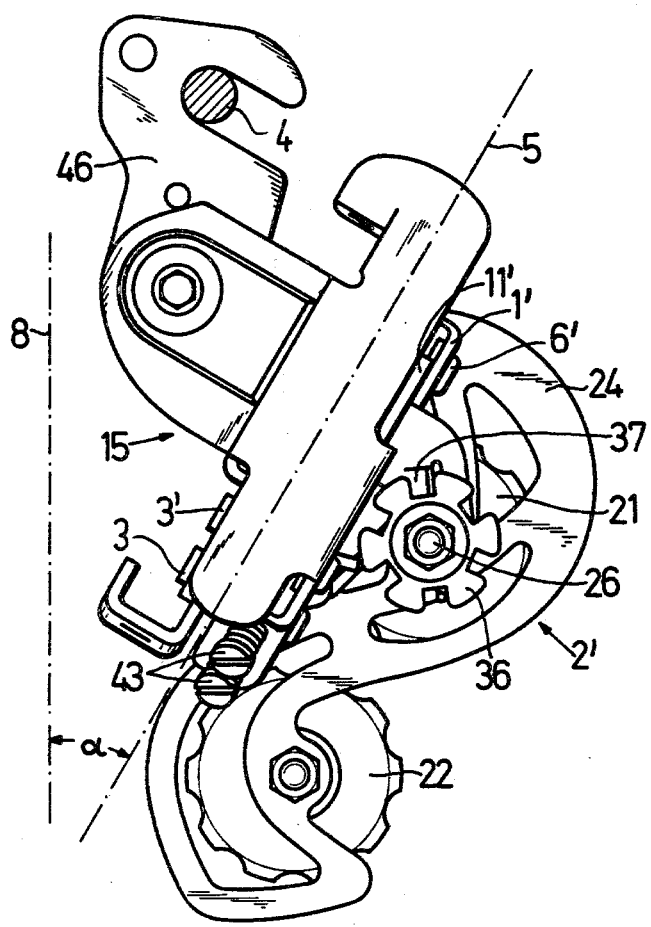

In the modified derailleur arrangement shown in FIGS. 4 to 6, the individual elements have been provided with the same reference numerals as their functional equivalents in FIGS. 1 to 3, significant structural differences, if any, being indicated by primed reference numerals.

The approximately channel-shaped support 15 is adjustably fixed to the shaft 4 by a bracket 46. It largely envelops the other elements of a four-bar coupling, the two links 10', 11', and the coupler 1', the linkage being assembled by means of pivots 3, 3', 6, 6'. The coupler 1' has two parallel lugs 33 perpendicular to the axis of the shaft 4. A sleeve 34 is rotatably received in openings of the lugs 33 and coaxially receives the bolt 26. A chain guiding sprocket 21 is journaled on the portion of the bolt 26 between the head of the bolt and one of the lugs 33 on a bushing 27, the same portion of the bolt also accomodating two flat chain guides 23, 24. A tensioning sprocket 22 is arranged between the guides 23, 24. The coil spring 25 enveloping the sleeve 34 is fastened at one end to the flat guide 24 and at the other end to a radially notched adjusting disc 36. An integral abutment 37 projecting from the adjacent lug 33 into a notch of the disc 36 prevents angular displacement of the latter under the force of the spring 25 so that the chain guiding and tensioning device 2' is biased clockwise, as viewed in FIG. 4 The tension of the spring 25 may be varied by shifting the abutment 37 among the notches in the disc 36. Washers 35 are axially interposed between the several elements mounted on the bolt 26 as needed.

The two abutment screws 43 which limit relative angular displacement of the several members of the four-bar linkage are mounted on the support 15 and cooperate with respective abutment portions of the link 10' in the two terminal positions of the linkage. They are readily accessible without disassembling the derailleur arrangement because their axes enclose an angle δ of about 30° to 50° with the orthogonal projection of the shaft axis in the plane 5 of linkage movement, as is shown in FIG. 6. They are protected against accidental damage by the support 15, particularly by the web 19.

The Bowden cable which may be operated to move the linkage members relative to each other has not been shown in FIGS. 4 to 6 nor the cam arrangement which causes different angular displacement of the linkage members in response to equal, sequential, longitudinal movements of the Bowden wire. It will be understood that the embodiment of FIGS. 4 to 6 is identical in this respect with that of FIGS. 1 to 3.

If the several sprockets 56 on the shaft 4 of the rear wheel 52 differ greatly in the number of their teeth, it may be advantageous to space the axis of rotation of the chain guiding sprocket from the pivot axis of the chain guiding and tensioning device. Modifications of the devices of FIGS. 2 and 5 satisfying this requirement are shown in FIGS. 7 and 8 respectively only to the extent that they differ from the afore-described apparatus.

Figure 7:
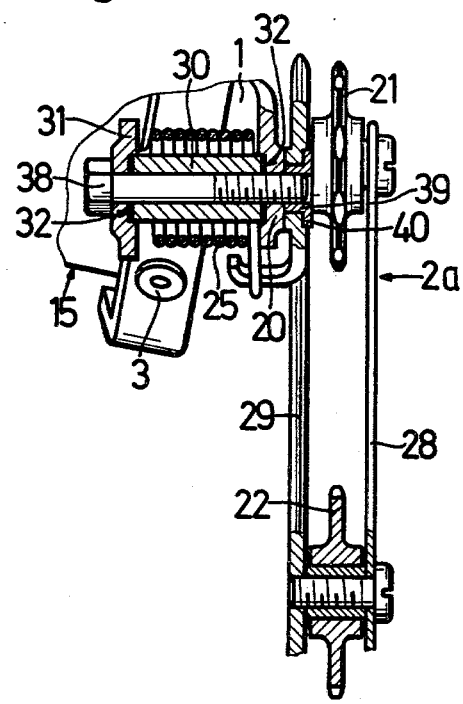
FIGS. 7 and 8 illustrate further modifications of the derailleur arrangement of FIGS. 1 to 3 in fragmentary views corresponding to that of FIG. 2.

The apparatus partly illustrated in FIG. 7 is identical with that described above with reference to FIGS. 1 to 3 except as specifically illustrated and described. The lug 20 of the coupler 1 is formed with an opening through which the threaded end of a bolt 38 passes. An internally threaded nipple 39 having a flange 40 is mounted on the bolt 38 in abutting engagement of the flange with the lug 20 and provides a bearing for the flat chain guide 29 of the guiding and tensioning device 2a. The chain guiding sprocket 21 and the chain tensioning sprocket 22 are mounted between the chain guide 29 and another flat chain guide 28 on respective bolts and sleeves as described above, the axis of rotation of neither sprocket coinciding with the pivot axis of the bolt 38.

A sleeve 30 is mounted on the bolt 38 between the recessed face of the lug 20 and the recessed face of the washer 31, and its polygonal ends 32 engage the recesses as described above. The washer 31 is axially secured by the head of the bolt 38, and a spring 25 biases the chain guide 29 for tensioning engagement of the sprocket 22 with the non-illustrated drive chain.

Figure 8:
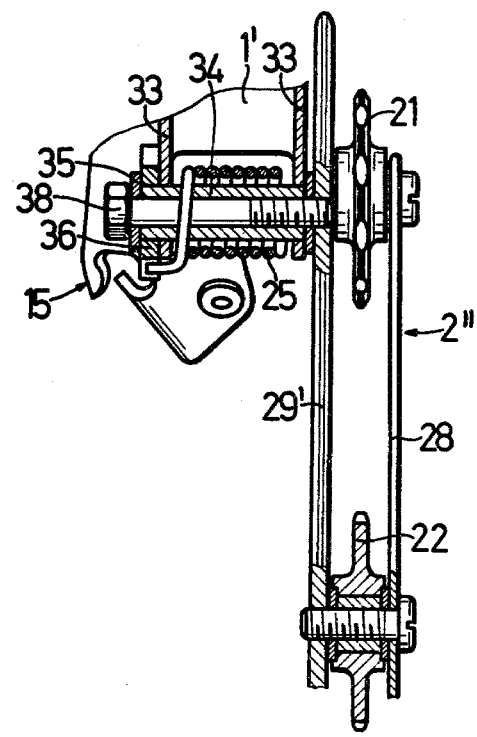

A modification of the apparatus of FIG. 5 analogous to that described above with reference to FIG. 7 is shown in FIG. 8, the device being identical with that illustrated in FIGS. 4 to 6 as far as not explicitly stated and shown otherwise.

The threaded end of a bolt 38 is fixedly fastened to a chain guide 29' connected to another chain guide 38 by two bolts supporting radially aligned sprockets 21, 22 neither of which is coaxial with the bolt 38. A sleeve 34 coaxially mounted on the bolt 38 is rotatably received in aligned openings of two lugs 33 of a coupler 1' so that the illustrated chain guiding and tensioning device 2" may pivot on the coupler 1' and is biased by a torsion spring 25 whose one end engages a radial notch in an adjusting disc 36 angularly secured on a lug 33 as described above. The other end of the spring 25 is fastened to the sleeve 34 and thereby to the chain guide 29'.

The several embodiments of the invention described above are relatively simple to build. High precision is needed only in drilling the openings in the members of the four-bar linkage which receive the pivot pins. The bores are readily located with reference to parallel or perpendicular surfaces of the linkage members without requiring complex jigs.

The preferred angle $\beta$ of 30° to 50° between the line 7 connecting the axes of the pivots 3, 3' and the orthogonal projection of the axis of the shaft 4 in the plane 5 permits the two terminal positions of the four-bar linkage to be approximately equidistant from an intermediate position in which flexing of the drive chain is at a minimum.

When the line connecting the axes of the pivots 3 and 6 encloses a very small angle, smaller than 15°, in the illustrated limiting position of highest speed, the chain may be shifted to larger sprockets on the shaft 4 by a greater angular displacement of the links 10, 11 than would otherwise be possible, so that the links can be made correspondingly shorter, or a greater number of coaxial sprockets can be swept by the sprocket 21.

The embodiments of the invention shown in FIGS. 7 and 8 may be used with bicycle frames not capable of being fitted with the derailleur arrangements in which the axis of rotation of the chain guiding sprocket coincides with the axis of pivoting movement of the chain tensioning device. Adaptation to such unusual frames is also facilitated by adjusting the two-part bracket 46.

While the invention has been disclosed with reference to a parallelogram linkage in which each pair of pivot axes is spaced the same distance as the other pair, many of the advantages of the invention are available with linkages having only two members of equal effective length, or even four members of different lengths.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the attached claims.

What is claimed is:

1. In a bicycle including a frame, a first shaft and a second shaft on said frame having respective axes and carrying a first wheel and a second wheel respectively for rotation about said axes; said first shaft being movable on said frame toward and away from a position in which said axes are parallel; said wheels in said position of said shafts defining a first plane tangential to each of said wheels and spaced from said frame, and a family of lines perpendicular to said tangential plane; chain drive means on said frame including a drive chain; a plurality of sprocket wheels having different respective numbers of teeth and coaxially secured to said second wheel; and a derailleur arrangement including a guide sprocket engaging said drive chain and mounted on said frame for alternatively training said drive chain over said sprocket wheels; the improvement in the derailleur arrangement which comprises:
   (a) a four-bar linkage including a support member, two link members, a coupler member, and four pivots having parallel axes, the first and second one of said pivots securing said support member to said link members respectively, and the third and fourth pivots respectively securing said coupler member to said link members; and
   (b) fastening means fixedly fastening said support member to said frame in a position in which a second plane perpendicular to the axes of said pivots is parallel to the axis of said second shaft and inclined relative to said perpendicular lines at an angle of 15° to 45°,
       (1) said guide sprocket being secured to said coupler member for rotation in a third plane perpendicular to the axis of said second shaft,
       (2) said pivots being offset from said second shaft in a direction toward said first plane,
       (3) said first and second pivots being nearer said first plane than said third and fourth pivots; and
   (c) means for angularly moving one member of said linkage relative to another member of the linkage about the axis of the pivot connecting said one member to said other member and including
       (1) an elongated tension member engaging said one member at a point radially spaced from said last-mentioned axis, and
       (2) means varying the radial spacing of said point from said last mentioned axis in response to said angular moving.

2. In a bicycle as set forth in claim 1, said fastening means fastening said support to said second shaft.

3. In a bicycle as set forth in claim 2, a line connecting the axes of said first and second pivots in said second plane encloses an angle of 30° to 50° with the orthogonal projection of the axis of said second shaft in said second plane.

4. In a bicycle as set forth in claim 3, limiting means limiting movement of the members of said four-bar linkage about said pivots to two terminal positions, said first and third pivots connecting one of said link members to said support member and to said coupler member respectively, a line connecting the axes of said first and third pivots in said second plane being inclined at an angle not greater than 15° relative to a plane perpendicular to the axis of said second shaft in one of said terminal positions.

5. In a bicycle as set forth in claim 2, said one member being one of said link members, and said other member being said support member, said tension member being flexible and engaging a portion of said one link member offset from said connecting pivot in a direction away from said coupler member.

6. In a bicycle as set forth in claim 5, said portion of said one link member having a cam face spiraling in an arc about the axis of said connecting pivot, the radial spacing of said arc from the axis of said connecting pivot decreasing in a circumferential direction, said point being located on said cam face.

7. In a bicycle as set forth in claim 6, said tension member being the elongated wire of a Bowden cable additionally comprising a sheath enveloping a portion of said wire and abuttingly engaging said support member, said connecting pivot being one of said first and second pivots, and said tension member extending longitudinally away from said face toward the axis of said second shaft.

8. In a bicycle as set forth in claim 7, said supporting member being channel-shaped and having a web portion and two flange portions, said flange portions, said linkage, and said sprocket being offset from said web portion in a common axial direction relative to said second shaft.

9. In a bicycle as set forth in claim 2, a chain guide member secured to said coupler member for angular movement about an axis parallel to said axis of said second shaft, said guide sprocket and a tensioning sprocket being mounted on said chain guide member for rotation about respective, transversely spaced axes parallel to the axis of said second shaft, and yieldably resilient means biasing said chain guide member to move angularly on said coupler member.

10. In a bicycle as set forth in claim 9, the axis of rotation of said guide sprocket coinciding with the axis of angular movement of said chain guide member.

11. In a bicycle as set forth in claim 9, the axis of rotation of said guide sprocket being transversely spaced from the axis of angular movement of said chain guide member.

12. In a bicycle as set forth in claim 2, abutment means for limiting movement of the members of said linkage about said pivots to two terminal positions, said abutment means including at least one abutment member mounted on one of the members of said linkage for engagement with another member in one of said limiting positions, the abutment member being movable on said one member in said plane for varying said limiting positions, the direction of movement of said abutment member and the orthogonal projection of the axis of said second shaft enclosing an angle of 30° to 50°.

13. In a bicycle as set forth in claim 1, a line connecting the axes of said first and second pivots in said second plane enclosing an angle of 30° to 50° with the orthogonal projection of the axis of said second shaft in said second plane.

* * * * *